(12) United States Patent
Meng et al.

(10) Patent No.: US 11,428,657 B2
(45) Date of Patent: Aug. 30, 2022

(54) METHOD FOR CONTACTLESS ELECTROCHEMICAL IMPEDANCE MEASUREMENT

(71) Applicant: UNIVERSITY OF SOUTHERN CALIFORNIA, Los Angeles, CA (US)

(72) Inventors: Ellis F. Meng, Los Angeles, CA (US); Lawrence Yu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 16/306,663

(22) PCT Filed: Jun. 5, 2017

(86) PCT No.: PCT/US2017/035877
§ 371 (c)(1),
(2) Date: Dec. 3, 2018

(87) PCT Pub. No.: WO2017/210669
PCT Pub. Date: Dec. 7, 2017

(65) Prior Publication Data
US 2019/0227014 A1    Jul. 25, 2019

Related U.S. Application Data

(60) Provisional application No. 62/345,757, filed on Jun. 4, 2016, provisional application No. 62/345,263, filed on Jun. 3, 2016.

(51) Int. Cl.
*G01N 27/02* (2006.01)
*G01N 17/02* (2006.01)

(52) U.S. Cl.
CPC ........... *G01N 27/026* (2013.01); *G01N 17/02* (2013.01)

(58) Field of Classification Search
CPC .... G01N 27/02; G01N 27/026; G01N 27/028; G01N 27/06; G01N 27/07; H02J 50/10; H02J 50/12; H02J 50/80; H04B 5/043
See application file for complete search history.

(56) References Cited

U.S. PATENT DOCUMENTS

| 5,942,991 | A | * | 8/1999 | Gaudreau | G06K 19/0717 |
| | | | | | 324/337 |
| 6,111,520 | A | * | 8/2000 | Allen | B60C 23/0408 |
| | | | | | 324/655 |

(Continued)

FOREIGN PATENT DOCUMENTS

WO    2017/210669 A1    12/2017

OTHER PUBLICATIONS

Adrega, T. et al., "Stretchable gold conductors embedded in PDMS and patterned by photolithography: fabrication and electromechanical characterization," J. Micromech. Microeng. 20 (2010), 8 pgs.

(Continued)

*Primary Examiner* — Huy Q Phan
*Assistant Examiner* — Dustin R Dickinson
(74) *Attorney, Agent, or Firm* — Brooks Kushman P.C.

(57) ABSTRACT

A sensor for measuring electrochemical impedance includes a primary circuit that includes a primary electrically conducting coil and a secondary circuit that includes a secondary electrically conducting coil. The primary electrically conducting coil is inductively coupled to the secondary circuit. During operation, the secondary electrically conductive couple has contact electrodes that contact a medium for which the impedance is to be measured. An alternating current source energizes the primary electrically conducting coil during impedance measurements.

22 Claims, 12 Drawing Sheets

(56) References Cited

U.S. PATENT DOCUMENTS

| | | | | |
|---|---|---|---|---|
| 6,454,029 | B1* | 9/2002 | Loots | E21B 10/43 |
| | | | | 175/420.1 |
| 7,948,380 | B2* | 5/2011 | Kuhns | H04B 5/02 |
| | | | | 340/572.1 |
| 2008/0204275 | A1* | 8/2008 | Wavering | G01N 17/04 |
| | | | | 340/870.16 |
| 2013/0085408 | A1* | 4/2013 | Pool | A61B 17/025 |
| | | | | 600/547 |
| 2013/0106447 | A1* | 5/2013 | Bridges | G01N 17/04 |
| | | | | 324/700 |
| 2013/0131618 | A1 | 5/2013 | Abraham et al. | |
| 2014/0002111 | A1 | 1/2014 | Potyrailo et al. | |
| 2014/0090451 | A1* | 4/2014 | Surman | G01N 27/026 |
| | | | | 73/61.43 |
| 2014/0091811 | A1* | 4/2014 | Potyrailo | G06K 19/0723 |
| | | | | 324/602 |
| 2014/0176063 | A1 | 6/2014 | Forsell | |
| 2014/0336485 | A1 | 11/2014 | Mujeeb-U-Rahman et al. | |
| 2015/0053575 | A1 | 2/2015 | Bridges et al. | |

OTHER PUBLICATIONS

Allen, M.G., "Micromachined Endovascularly-Implantable Wireless Aneurysm Pressure Sensors: From Concept to Clinic," The 13th International Conference on Solid-State Sensors, Actuators and Microsystems, Seoul, Korea, (2005), pp. 275-278.

Anderson, J.M. et al., "Foreign body reaction to biomaterials," Seminars in Immunology 20 (2008), pp. 86-100.

Baldwin, A. et al., "An Electrochemical-Based Thermal Flow Sensor," University of Southern California, Los Angeles, CA, USA, Conference Paper (2016), 4 pgs.

Bamberg, S.J.M. Eta Al., "Gait Analysis Using a Shoe-Integrated Wireless Sensor System," IEEE Transactions on Information Technology in Biomedicine, v. 12, n. 4, (2008), pp. 413-423.

Bowman, L. et al., "The Packaging of Implantable Integrated Sensors," IEEE Transactions on Biomedical Engineering, v. BME-33, n. 2, (1986), pp. 248-255.

Chen, P.-J. et al., "Microfabricated Implantable Parylene-Based Wireless Passive Intraocular Pressure Sensors," J. of Microelectromechanical Systems, v. 17, n. 6, (2008), pp. 1342-1351.

Czarnecki, A.E., "Efficient Inductively Coupled Resonant Power Transfer for an Implantable Electroencephalography Recording Device," A Thesis Presented by Andrew E. Czarnecki to The Department of Electrical and Computer Engineering, Northeastern University, Boston, MA, (2012), pp. 1-96.

International Search Report dated Aug. 25, 2017 for PCT/US2017/035877 filed Jun. 5, 2017, 17 pgs.

Spillman, Jr., W.B. et al., "Non-contact power/iterrogation system for smart structures," North American Conference on Smart Structures and Materials, 1994, SPIE, vol. 2191, pp. 362-372 (downloaded from https://www.spiedigitallibrary.org/conference-proceedings-of-spie on May 4, 2020).

Tai, C-C. et al., "Thickness and conductivity of metallic layers from pulsed eddy-current measurements," Review of Scientific Instruments 67, 3965 (1996), 9 pgs.

* cited by examiner

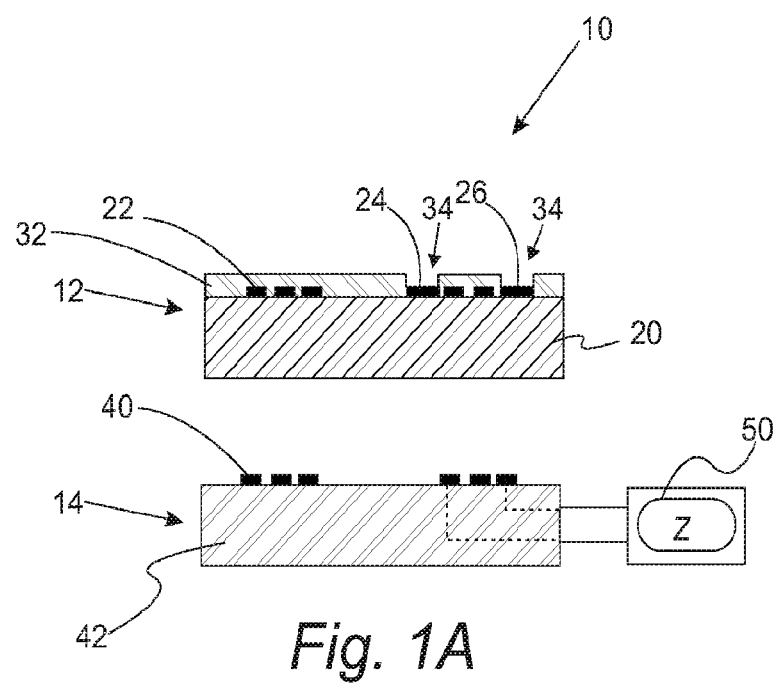
Fig. 1A
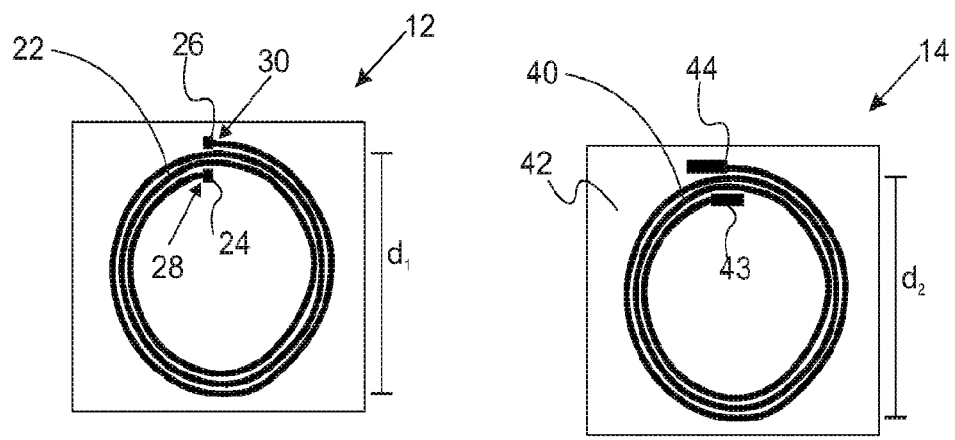
Fig. 1B
Fig. 1C $$Z_R = n^2 Z_S$$

METHOD FOR CONTACTLESS ELECTROCHEMICAL IMPEDANCE MEASUREMENT

CROSS-REFERENCE TO RELATED APPLICATIONS

This application is the U.S. National Phase of PCT Appln. No. PCT/US2017/035877 filed Jun. 5, 2017, which claims the benefit of U.S. provisional application Ser. No. 62/345,263 filed Jun. 3, 2016 and 62/345,757 filed Jun. 4, 2016, the disclosures of which are hereby incorporated in their entirety by reference herein.

STATEMENT REGARDING FEDERALLY SPONSORED RESEARCH OR DEVELOPMENT

The invention was made with Government support under Contract No. ECCS1231994 awarded by the National Science Foundation. The Government has certain rights to the invention.

TECHNICAL FIELD

In at least one aspect, the present invention is related to an apparatus for measuring electrochemical impedance.

BACKGROUND

Conductivity measurements are conventionally transmitted using a variety of techniques, with each making use of active circuitry such as microcontrollers, ASICs, or discrete components [1-6]. These components, along with an antenna or inductive coil, are typically soldered onto a printed circuit board (PCB). To mitigate cytotoxicity and the immune response, these electronics are typically encapsulated with biocompatible polymers such as Parylene C and PDMS [7-10]. However, the in vivo environment continues to pose a formidable challenge for the development of implantable microelectronic systems.

A variety of factors can induce sensor drift or failure. Water vapor and ion permeation create undesired paths for electric current and can alter critical bias voltages [11]. The inflammatory response to foreign bodies can subject the implant to a highly oxidative or acidic environment [12]. Blood flow and other involuntary movements can subject the implant to chronic and repeated mechanical strain. Such events can damage sensitive components or introduce errors in signal measurement and transmission.

The presence of the implant should also minimize harm to the host environment. The materials selected for the packaged device should be nontoxic and induce minimal immune response. The use of soft, flexible materials (i.e. those mechanically matching tissue properties) and elimination of sharp corners also serves to minimize damage to tissue [13]. Power requirements for electronics should be kept in check to minimize heating to safe levels.

To address these issues, an alternate approach would be the use of passive components. Currently, many methods exist to interrogate capacitive signals wirelessly, with notable examples of pressure, force, and strain measurement [13-15]. However, few attempts have been made to enable passive, wireless resistive measurement. One work incorporated a resistive strain gauge with a coil and capacitive element on a polyimide circuit board [16], but this was not intended for use in the wet, in vivo environment. Specifically, its coil and transduction elements were fabricated on a stiff substrate and the components are soldered together using non-biocompatible materials. A notable effort utilized eddy currents to passively and wirelessly determine conductivity and thickness of metallic layers [17]. This technique has a different purpose and is difficult to apply to in vivo measurements.

Accordingly, there is a need for improved method of making electrical conductivity and impedance measurements under wet and physiological conditions.

SUMMARY

The present invention solves one or more problems of the prior art, by providing in at least one embodiment a sensor for measuring electrochemical impedance of a medium. The sensor includes a primary circuit and a secondary circuit. The primary circuit includes a primary electrically conducting coil. The secondary circuit includes a first electrically insulating layer, a secondary electrically conducting coil disposed over and contacting the first electrically insulating layer, a first metal contact electrode, a second metal contact electrode, and a second electrically insulating layer disposed over the secondary electrically conducting coil. The secondary electrically conducting coil includes a first end and a second end that are attached respectively to the first metal contact electrode and the second metal contact electrode. The second electrically insulating layer defining openings that expose the first metal contact electrode and the second metal contact electrode so that the medium for which measurement are performed can be contacted. The primary electrically conducting coil is inductively coupled to the secondary electrically conducting coil. During operation, an alternating current source energizes (e.g., applies an alternating current to) the primary electrically conducting coil during impedance measurements.

In another embodiment, a method for measuring electrochemical impedance using the sensor set forth herein is provided. The method includes a step of contacting the first metal contact electrode and the second metal contact electrode of the secondary circuit with a liquid medium for which an impedance is to be measured. The primary electrically conducting coil is positioned proximate to the secondary electrically conducting coil such that the primary electrically conducting coil is inductively coupled to the secondary electrically conducting coil. An alternating current is applied to the primary electrically conducting coil to perform an impedance measurement.

In still another embodiment, a method for forming the sensor for measuring electrochemical impedance set forth herein is provided. The method includes a step of coating a support substrate with a first electrically insulating layer. An optional adhesion layer and a first metal layer is patterned onto the first electrically insulating layer with the optional adhesion layer if present interposed between the first electrically insulating layer and the first metal layer. The optional adhesion layer and the first metal layer are patterned into a secondary electrically conducting coil with a first contact electrode and a second contact electrode. A second electrically insulating layer is deposited over secondary electrically conducting coil. The first contact electrode and a second contact electrode are then exposed by removing a portion of the second electrically insulating layer. Finally, the support substrate is separated from the first electrically insulating layer to release a secondary circuit.

Advantageously, the noncontact method and apparatus for measuring electrochemical conductivity of the present invention can be used in wet, ionic environments such as in vivo settings. Chronic recording of physiological signals via the use of implanted sensors has been a long-standing goal for the medical and scientific community. Such sensors would enable continuous monitoring to facilitate greater understanding of disease progression as well as inform course of treatment. However, the in vivo environment poses a formidable challenge for the development of telemetry circuitry. The combination of the corrosive environment and constant movement can damage sensitive components or introduce errors in signal measurement and transmission. To minimize harm to the host environment, materials should be nontoxic and flexible. Power requirements should be kept in check to minimize heating to safe levels. Historically, wireless transmission of conductivity or resistivity has been limited to the use of active circuitry (i.e. microcontrollers, ASICs). This burdens system design by adding power constraints, thermal budget concerns, and bulk to the overall package. To address these concerns, the present invention introduces the use of reflected impedance across a pair of inductively coupled coils to achieve wireless resistive measurement. A variety of techniques based on electrochemical impedance measurement have been investigated (e.g. flow, pressure, or liquid volume sensing). This technique is widely applicable for resistive transduction and obviates the need for microcontrollers, discrete electronic components, and batteries. In addition, because of the thin film construction and simplicity, this method and sensing modality can be easily applied to a broad spectrum of applications.

BRIEF DESCRIPTION OF THE DRAWINGS

FIG. 1A is an idealized schematic cross section of a sensor having a first circuit and a second circuit.

FIG. 1B is a top view of the secondary circuit of FIG. 1A.

FIG. 1C is a top view of the primary circuit of FIG. 1A.

DETAILED DESCRIPTION

Figure 2:
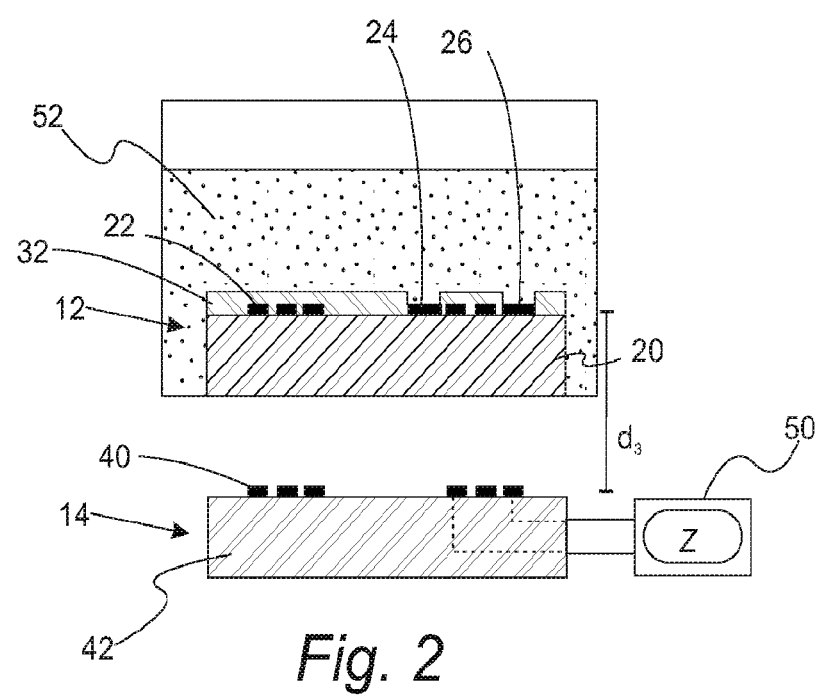
FIG. 2 is an idealized schematic of the sensor of FIGS. 1A-C in contact with a medium for performing impedance measurement thereof.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," irregular combinations of these, and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

ABBREVIATION

"PDMS" means polydimethoylsiloxane.
"PCB" means printed circuit board.
"PBS" means phosphate buffered saline.
"RF" means radio frequency.

With reference to FIGS. 1A-C, a sensor for measuring electrochemical impedance is provided. FIG. 1A is an idealized schematic cross section of the sensor which has a primary circuit and a secondary circuit. FIG. 1B is a top view of the secondary circuit. FIG. 1C is a top view of the primary circuit. The sensing system 10 includes a secondary circuit 12 and a primary circuit 14. The secondary circuit 12 includes a first electrically insulating layer 20, a secondary electrically conducting coil 22 disposed over and contacting the first electrically insulating layer, and a pair of metal contact electrodes 24, 26. In a refinement, metal contact electrodes 24, 26 are separated by a distance of about 500 μm to 5000 μm. Typically, first electrically insulating layer 20 is a polymeric layer (e.g., poly(p-xylylene) polymers such as Parylene, PDMS, etc.). Secondary electrically conducting coil 22 includes a first end 28 and a second end 30 that are attached to contact electrodes 24, 26, respectively. Conveniently, secondary electrically conducting coil 22 is deposited as a spiraling metal layer onto first electrically insulating layer 20 along with contact electrodes 24, 26. In a refinement, the secondary electrically conducting coil has a spatial extent $d_1$ (i.e., outer diameter) from 1 to 20 centimeters.

A second electrically insulating layer 32 is disposed over and contacts secondary electrically conducting coil 22. Typically, second electrically insulating layer 32 is a polymeric layer (e.g., poly(p-xylylene) polymers such as Parylene, PDMS, etc.). Openings 34 and 36 in second electrically insulating layer 32 advantageously expose contact electrodes 24, 26 thereby allow these electrodes to contact a medium when measurements are made. In a refinement, these openings have a cross section from about 100 μm×100 μm to about 600 μm×600 μm. In another refinement, these openings have a cross sectional area from about 0.01 mm² to about 0.4 mm².

Primary circuit 14 includes a primary electrically conducting coil 40. In one refinement, primary circuit 14 includes electrically insulating substrate 42 over which primary electrically conducting coil 40 is positioned. Although virtually any coil arrangement may be used for primary circuit and primary electrically conducting coil 40, a construction similar to secondary circuit 12 is useful. In a refinement, the primary coil can be completely insulated in a manner similar to the secondary coil. Moreover, electrically conducting coil 40 does not have to be planar and can be a multi-layer coil (e.g., wound insulated wires).

Alternating current source 50 energizes the primary electrically conducting coil 40 by applying an alternating current thereto. In a refinement, alternating current source 50 is an impedance meter used to measure the impedance of primary electrically conducting coil 40 which is inductively coupled to secondary electrically conducting coil 22 as set forth below.

The size of the secondary electrically conducting coil 22 is maximized to optimize coupling with the primary electrically conducting coil 40. Coupling can also be improved by increasing the number of turns to capture increased magnetic flux. However, this can result in a large and unwieldy device footprint for implant applications. In a refinement, the number of windings in secondary electrically conducting coil 22 is from 1 to 50. In another refinement, the number of windings in secondary electrically conducting coil 22 is from 2 to 30. The present invention is not limited by the specific dimensions of the spirally metal layers forming secondary electrically conducting coil 22. However, metal layers having a thickness from about 300 angstroms to about 1 micron and widths from about 50 microns to 200 microns are found to be useful for secondary electrically conducting coil 22. Moreover, adjacent windings can be separated by distances of 50 microns to 300 microns.

Additional improvement in coupling between secondary electrically conducting coil 22 and primary electrically conducting coil 40 can be achieved using a ferrite core on the primary electrically conducting coil. In a refinement, the size and number of turns of the secondary electrically conducting coil are such that the inductance of secondary electrically conducting coil 22 is from 1 to 100 microhenries. Moreover, the size and number of turns of the secondary electrically conducting coil are advantageously such that the coupling coefficient is greater than 0.8. In a refinement, the coupling coefficient is from 0.8 to 1. In this context, the coupling coefficient is given by the following formula:

$$k = \frac{M}{\sqrt{L_1 L_2}}$$

where
k is the coupling coefficient,
M is the mutual inductance,
$L_1$ is the inductance of the primary electrically conducting coil, and
$L_2$ is the inductance of the secondary electrically conducting coil. Larger values of the coupling coefficient indicate stronger coupling.

Primary circuit 14 includes a primary electrically conducting coil 40. In one refinement, primary circuit 14 includes electrically insulating substrate 42 over which primary electrically conducting coil 40 is positioned. Although virtually any coil arrangement may be used for primary circuit and primary electrically conducting coil 40, a construction similar to secondary circuit 12 is useful. Therefore, primary electrically conducting coil 40 can include a spiraling metal layer and can have also a spatial extent $d_2$ (i.e., outer diameter) from 1 to 20 centimeters. Therefore, the number of windings in primary electrically conducting coil 40 can be from 1 to 50. In another refinement, the number of windings in primary electrically conducting coil 40 can be from 2 to 30. As set forth for the secondary electrically conductive coil, the present invention is not limited by the specific dimensions of the spirally metal layers in primary electrically conducting coil 40. However, metal layers having a thickness from about 300 angstroms to about 1 micron and widths from about 50 microns to 200 microns are found to be useful for primary electrically conducting coil 40. Moreover, adjacent windings can be separated by distances of 50 microns to 300 microns. In a refinement, primary electrically conducting coil 40 can also include contact tabs 43, 44 to assist in attaching a current source to the primary electrically conducting coil.

With reference to FIGS. 1A-C and 2, a method for measuring electrochemical impedance with the sensor set forth above is provided. FIG. 2 is a schematic illustration showing the contacting of the sensor with a medium. First metal contact electrode 24 and the second metal contact electrode 26 of the secondary circuit 12 are exposed to and contacted with medium 52 (e.g., a liquid medium such as an aqueous medium) for which an impedance is to be measured. Primary electrically conducting coil 40 is positioned proximate to but spatially separated from secondary electrically conducting coil 22 such that primary electrically conducting coil 40 is inductively coupled to secondary electrically conducting coil 22. In this context, proximate to means that primary electrically conducting coil 40 is positioned within a distance $d_3$ of secondary electrically conducting coil 22 (i.e., between centers) such that the coupling is established (e.g., within 5 centimeters). As set forth above, alternating current source 50 energizes the primary electrically conducting coil 40 by applying an alternating current thereto.

Figure 3:
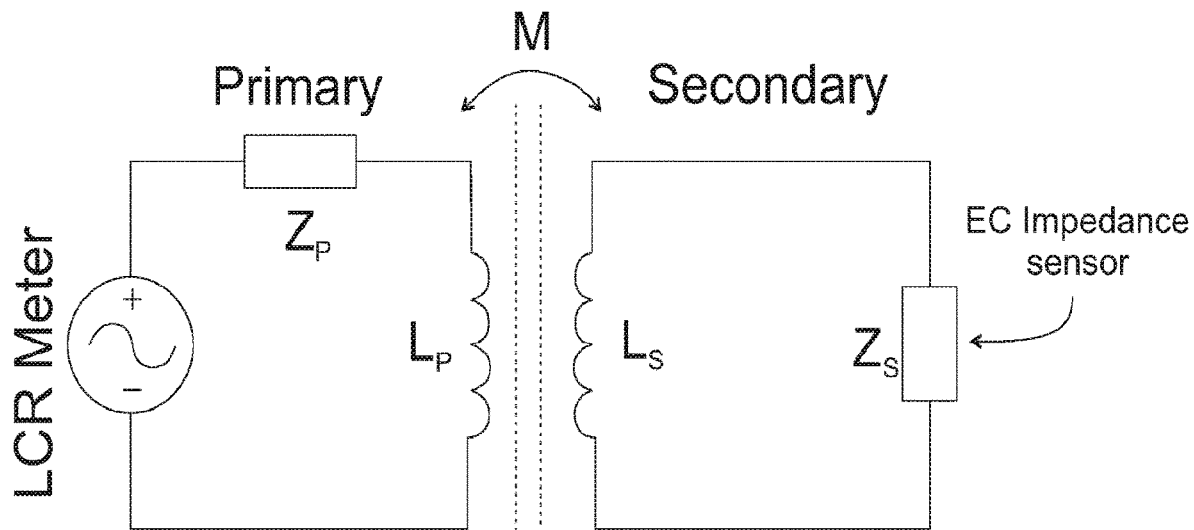
FIG. 3: Schematic of reflected impedance principle, where $Z_P$ represents the complex impedance of the primary circuit resistance and capacitance, $L_P$ and $L_S$ the inductances of coupled coils, and $Z_S$ the complex impedance of the load on the secondary circuit. An AC source (LCR meter) induces current within the secondary circuit across a pair of inductively coupled coils (mutual inductance M).
Figure 4:
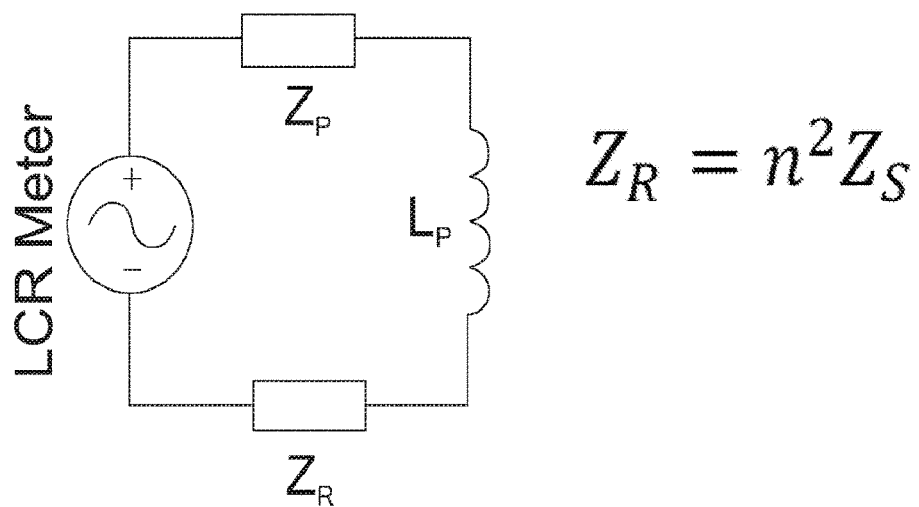
FIG. 4: Equivalent single primary loop circuit with reflected impedance represented as $Z_R$. As shown in the equation on right, changes in electrochemical impedance (or $Z_S$ in this case) are ultimately manifested as a change in $Z_R$ with $n^2$ being the turns ratio.

Non-contact electrochemical impedance measurement is achieved by observing changes in reflected load across the pair of inductively coupled coils 22 and 40. The pair of inductively coupled coils as set forth above shares the properties of a transformer. An alternating current source (e.g. from impedance meter 50) induces a varying magnetic field in the primary electrically conducting coil, which then induces a varying electromotive force in the secondary electrically conducting coil (FIG. 3). To simplify, an equivalent single loop model that lumps the secondary circuit into a complex impedance term may be utilized (FIG. 4). Due to conservation of energy, a load that is attached to the secondary electrically conducting coil will result in an apparent load on the primary side, as represented in FIG. 4 In this manner, changes in the secondary load may be reflected across the inductively coupled coils and measured as changes on the primary side [18].

Figure 5A:
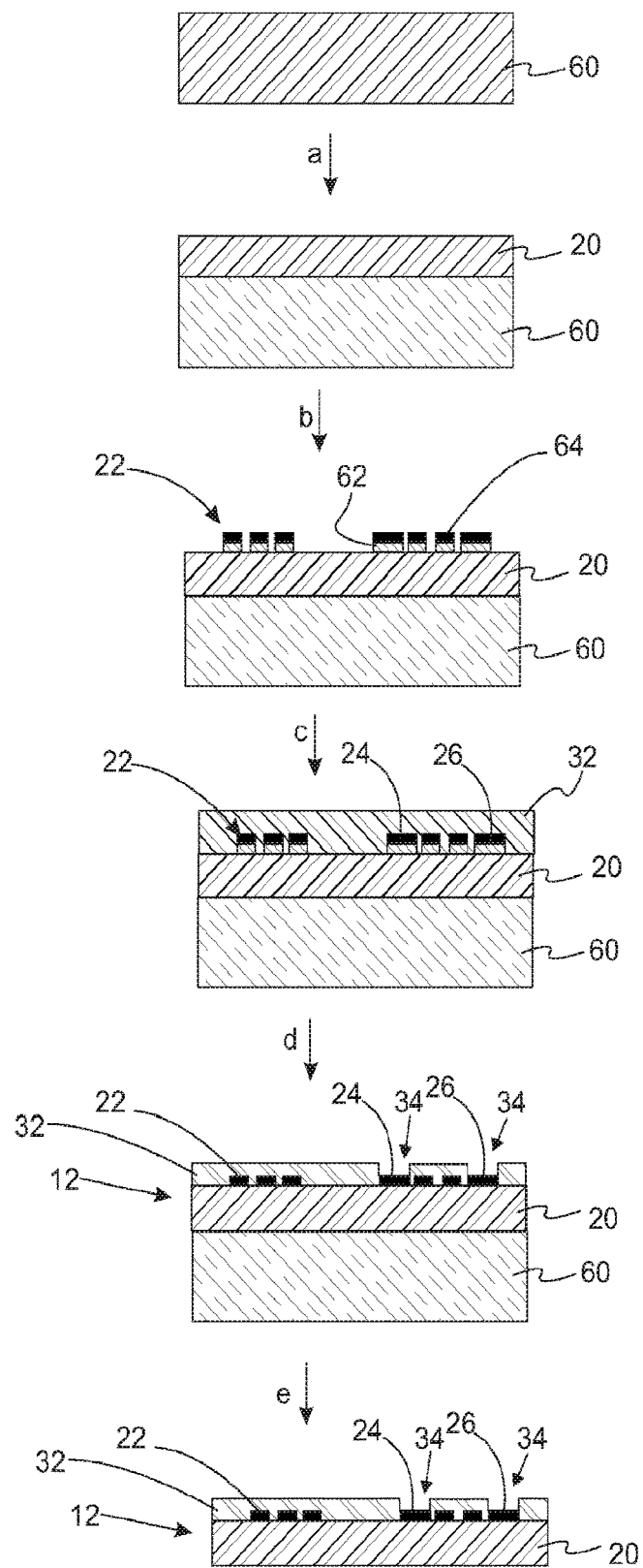
FIG. 5A is a schematic flowchart illustrating a method for forming the secondary circuit of the sensor for measuring electrochemical impedance.
Figure 5B:
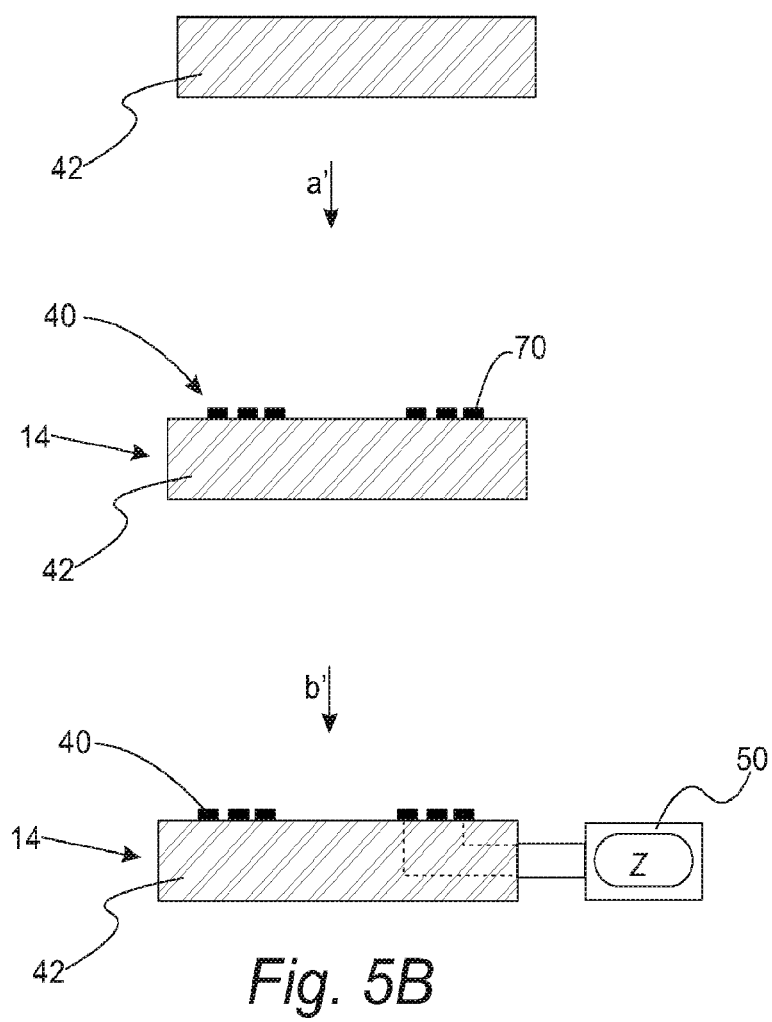
FIG. 5B is a schematic flowchart illustrating a method for forming the primary circuit of the sensor for measuring electrochemical impedance.

In another embodiment, a method for forming a sensor for measuring electrochemical impedance is provided. As depicted in the flowchart of FIG. 5A, a substrate 60 is coated with first electrically insulating layer 20 in step a). Virtually any material can be used for substrate 60 so long as ultimately polymeric layer 20 can be removed. A useful substrate is a silicon wafer. In a refinement, first electrically insulating layer 20 is a polymeric layer. Examples of materials for such a polymeric layer include, but are not limited to, poly(p-xylylene) polymers (e.g., Parylene), PDMS, and the like. In step b), an optional adhesion layer 62 and a metal layer 64 are patterned onto first electrically insulating layer 20 with the adhesion layer interposed between the polymeric layer 20 and the metal layer. In this regard, titanium is found to be a particularly useful material for the adhesion layer. Metal layer 64 can be formed from virtually any metal. For example, metal layer 64 can be gold, platinum, aluminum, copper, nickel, cobalt, stainless steel, and the like. Moreover, optional adhesion layer 62 and a metal layer 64 can be deposited by sputtering, evaporation, chemical vapor deposition, and the like. Patterning of metal layer 64 can be achieved with a mask during deposition or by etching after deposition. In particular, optional adhesion layer 62 and a metal layer 64 are patterned to form secondary electrically conducting coil 22. Contact electrodes 24, 26 are also patterned in this step. In step c), second electrically insulating layer 32 is deposited over and contacts secondary coil 22 as well as portion of first electrically insulating layer 20 that are not overcoated with optional adhesion layer 62 and a metal layer 64. Therefore, optional adhesion layer 62 and a metal layer 64 are embedded between first electrically insulating layer 20 and second electrically insulating layer 32. In step d), contact electrodes 24, 26 are exposed with dimensions as set forth above. In step e), substrate 60 is separated from secondary circuit 12. As depicted in FIG. 5B, primary circuit 14 is formed by patterning metal layer 70 onto electrically insulating substrate 42. As set forth above, metal layer 70 can be formed from virtually any metal. For example, metal layer 70 can be gold, platinum, aluminum, copper, nickel, cobalt, stainless steel, and the like and may include an optional adhesion layer. Moreover, metal layer 70 can be deposited by sputtering, evaporation, chemical vapor deposition, and the like. Patterning of metal layer 70 can be achieved with a mask during deposition or by etching after deposition.

Advantageously, the materials selected for use in the various embodiments have a proven track record for use within the in vivo environment. Thin film gold was used for the electrodes due to its inertness and its well-characterized electrochemical properties [19]. Electrode size and spacing were based on previous investigations on electrochemical impedance sensing [20]. The low resistivity of gold also serves advantageous for its use as a coil in RF applications. Parylene C was selected as the substrate and to encapsulate the electrodes and coil, due to its excellent insulation properties as well as its amenability to microfabrication processes [21].

The following examples illustrate the various embodiments of the present invention. Those skilled in the art will recognize many variations that are within the spirit of the present invention and scope of the claims.

Figure 6:
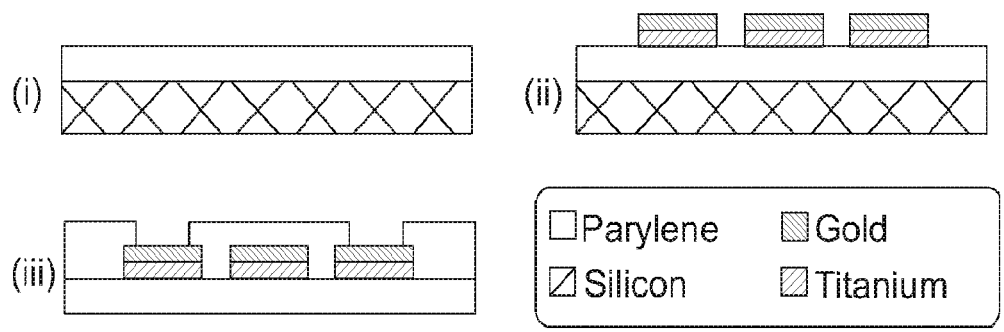
FIG. 6: Overview of fabrication process. (i) Deposition of 10 μm thick Parylene C substrate. (ii) Patterning and deposition of Ti adhesion layer and Au. (iii) Deposition of 10 μm Parylene insulation layer, reactive ion etching ($O_2$) to expose electrode sites, release, and cutout from silicon substrate.

The fabrication of this thin film polymer device was based on previously reported methods [20]. A pair of Au electrodes (2000 Å thick on 200 Å Ti adhesion layer, 300 μm×300 μm, 500 μm-5000 μm electrode-to-electrode spacing) attached to a planar coil (30 mm diameter, 1-16 turns) was patterned and electron beam evaporated onto a flexible Parylene C substrate (10 μm thick) (FIG. 6). Following deposition of another 10 m Parylene insulation layer, electrodes were exposed via $O_2$ plasma reactive ion etching (Technics RIE, 200 W, 150 mTorr) [22].

Figure 7:
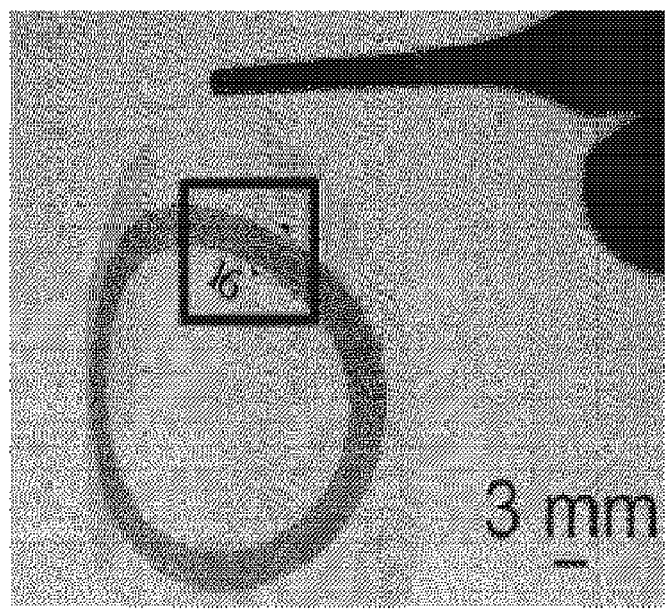
FIG. 7: Photograph of microfabricated and released thin film Parylene C device held by forceps. Sixteen turn coil device shown. One, five, and six turn coils were also fabricated.
Figure 8:
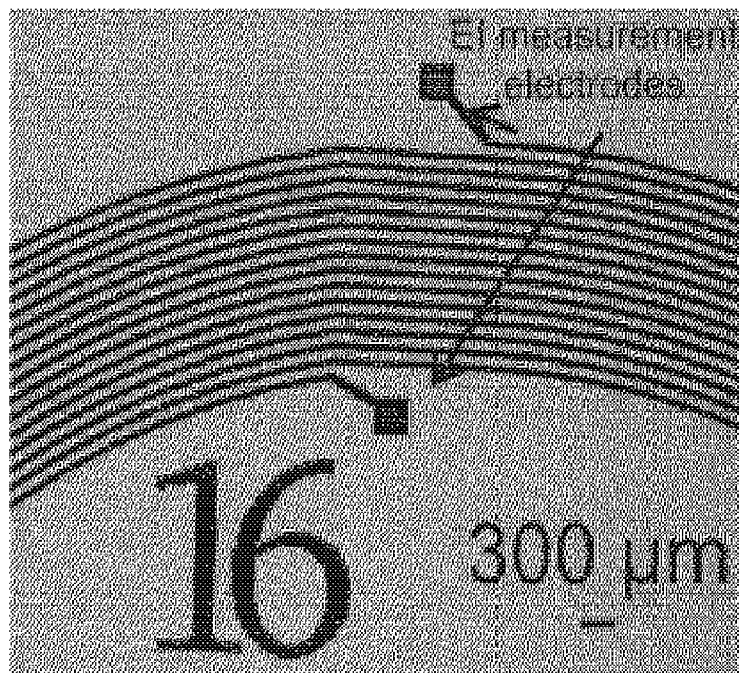
FIG. 8: Inset of FIG. 7; micrograph highlighting electrochemical impedance measurement electrodes (300×300 μm exposed area).

After cutout and release (FIGS. 7 and 8), the devices were placed in a polystyrene Petri dish and submerged in phosphate buffered saline (PBS) of various concentrations (0.5-10×, 8-150 mS/cm [23]) and temperatures (22° C.-65° C.) to mimic a range of typical and abnormal in vivo conditions. Deionized water was used to establish a baseline impedance reference.

Figure 9:
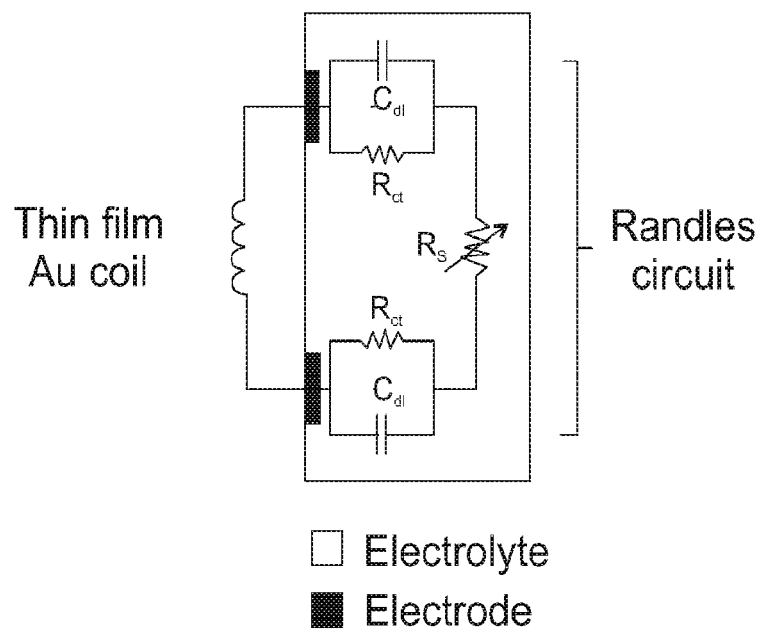
FIG. 9: Secondary circuit schematic, which comprises of insulated Au coil and Randles circuit model of electrodes submersed in electrolyte.

The secondary circuit comprises of the Au planar coil (L=11.1 µH, Q~1.5 at 2.198 MHz) and electrodes submerged in electrolyte, which can be represented by the Randles circuit model (FIG. 9). At resonant frequency, the reactance of the capacitive ($C_{dl}$) and inductive (thin film coil) elements will be equal in magnitude but opposite in sign. The resulting reflected impedance consists of the remaining resistive element, which is the solution resistance ($R_s$). The Petri dish (0.8 mm thick base) was placed onto and concentrically aligned with the commercially available primary electrically conducting coil having a ferrite core (24 µH, Q=180@125 kHz, Wurth Electronics, 50 mm diameter, 22 turns).

Figure 10:
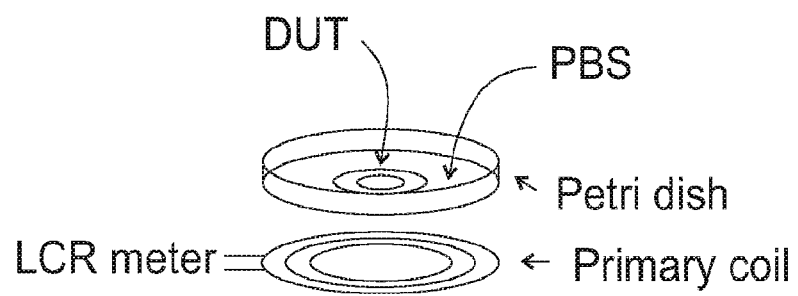
FIG. 10: Device under test (DUT) was placed within a Petri dish and submerged in PBS (phosphate buffered saline). Primary electrically conducting coil includes ferrite core to improve inductive coupling with thin film (secondary) coil. Not drawn to scale.
Figure 11:
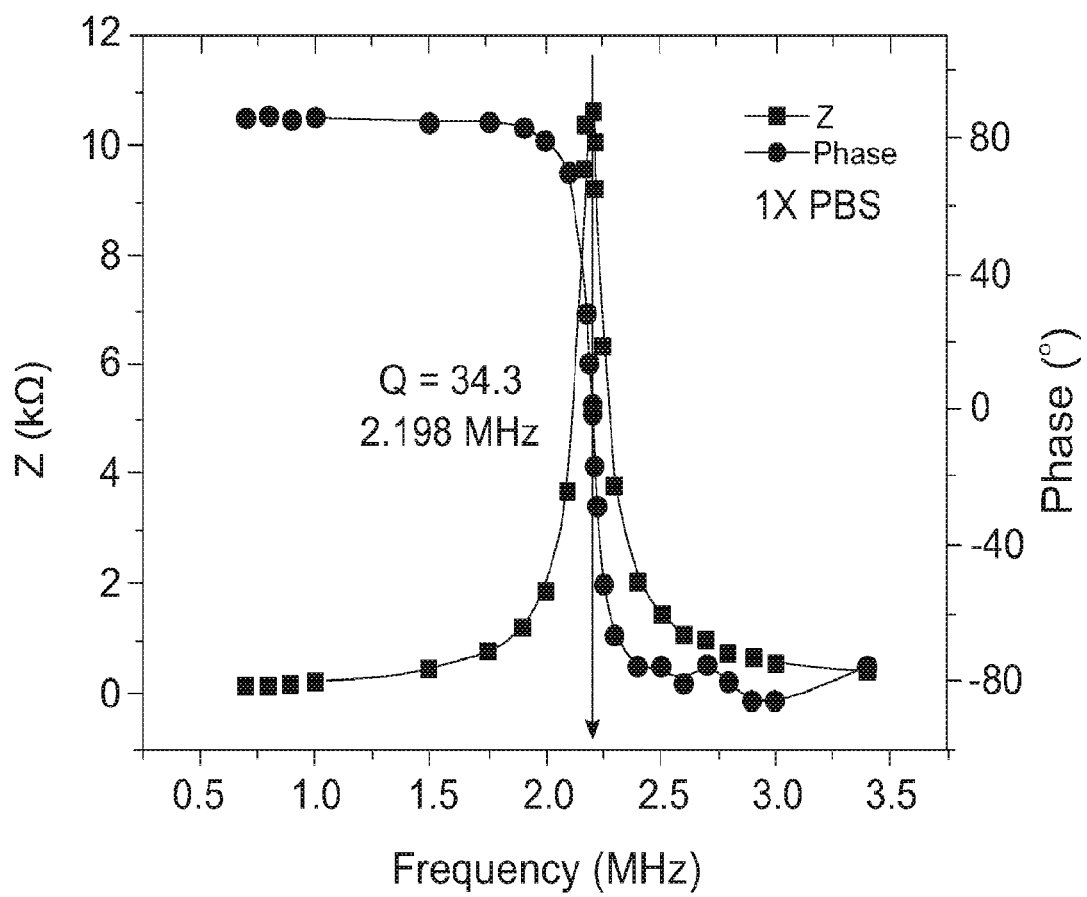
FIG. 11: Frequency response of system comprising of the primary electrically conducting coil coupled with the DUT. The excitation signal on the LCR meter was set to 2.198 MHz (minimum system phase to bypass double layer capacitance $C_{dl}$) for subsequent testing.

The primary electrically conducting coil was elevated (onto an additional Petri dish to prevent inadvertent coupling with the benchtop) and attached to an LCR meter (Hewlett Packard E4285A) (FIG. 10), which provided the AC signal and recorded the reflected impedance. The optimal measurement frequency was determined to be 2.198 MHz (Q=34.3, minimum phase, 1 $V_{p-p}$) to bypass the double layer capacitance ($C_{dl}$) in the Randles circuit (FIG. 11) [24]. At this measurement frequency, the impedance is dominated by the solution resistance. Reproducibility of coil position was achieved by observing phase angle measurement and adjusting alignment until minimum phase (<±1°) was attained. To assess misalignment performance, coil centers were translated up to 5 mm from initial alignment while measuring reflected impedance.

Figure 12:
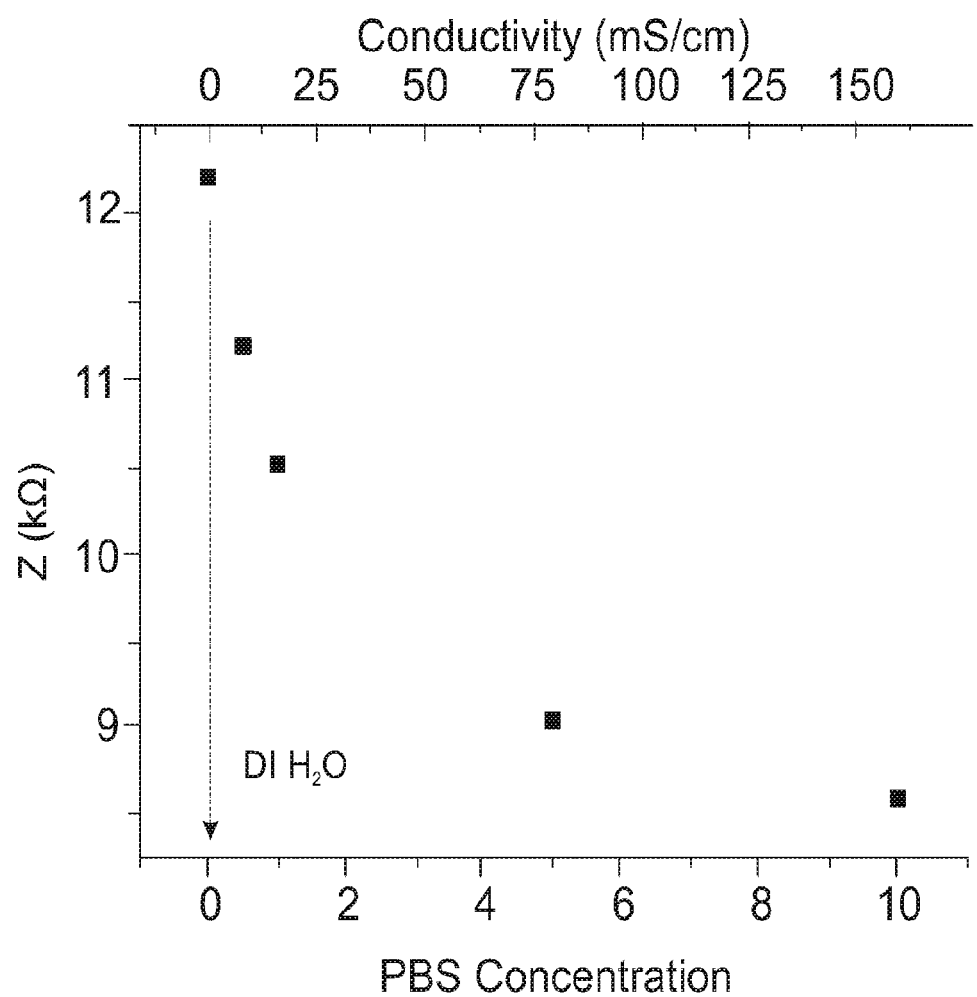
FIG. 12: Reflected impedance was observed to be inversely proportional to ionic concentration. Deionized water was used as a baseline reference and indicated using the arrow.
Figure 13:
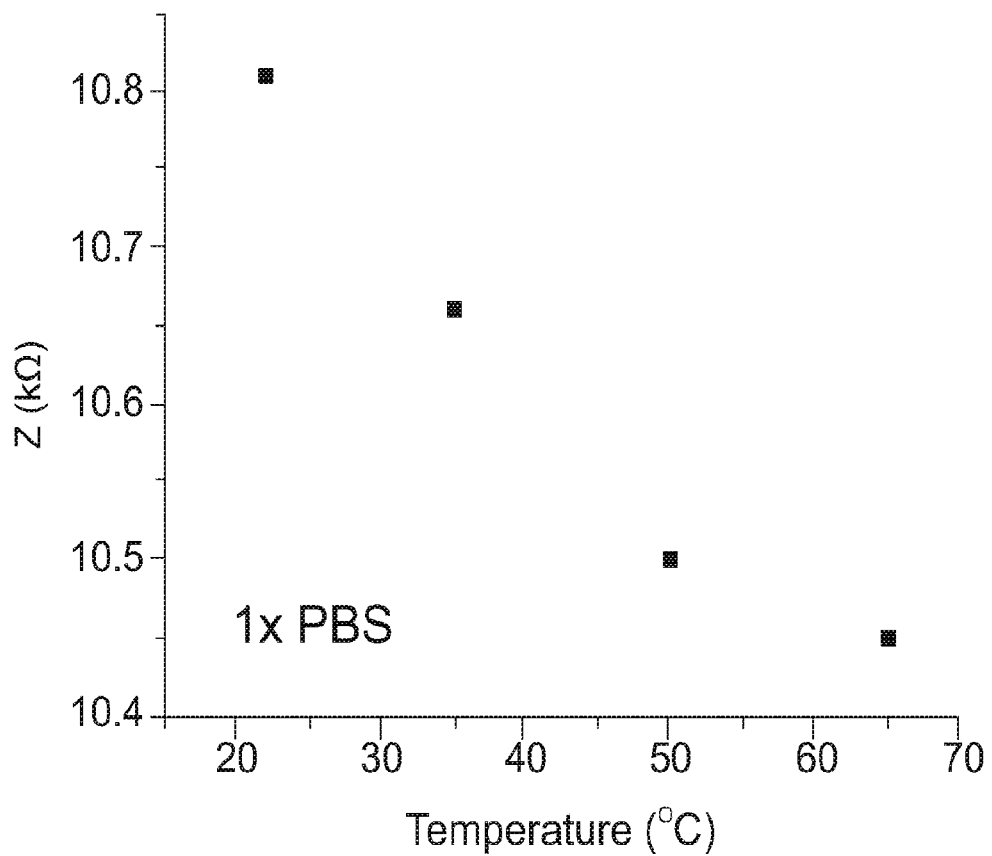
FIG. 13: Electrochemical impedance of 1×PBS was observed to be inversely proportional to temperature.
Figure 14:
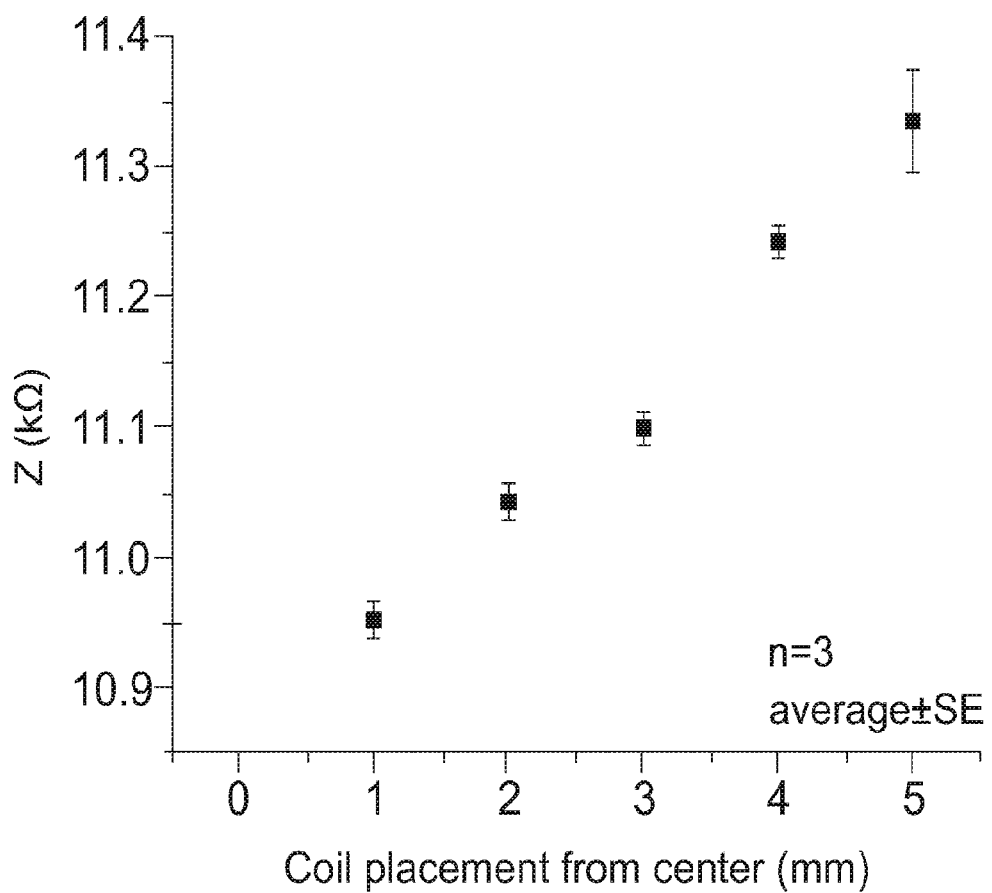
FIG. 14: Reflected impedance increased with coil misalignment across the range tested, but remained within 5% of baseline measurement.

Reflected electrochemical impedance was measured from fabricated devices and utilized to transduce ionic concentration and temperature of the electrolyte into which the devices were submerged (FIG. 12). The observed power draw at the primary electrically conducting coil was approximately 75 µW. Electrochemical impedance of ionic solutions has previously been shown with a direct wired measurement to be inversely proportional to temperature [25]. This relation was measured wirelessly using this reflected impedance method with 1×PBS across a range of different temperatures (FIG. 13). Reflected impedance increased linearly with coil misalignment by approximately 1% per mm of coil center offset (FIG. 14). The results were achieved with a 5 turn thin film coil, and preliminary results suggest that altering coil diameter and increasing turn count can reduce misalignment effects on baseline impedance measurement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] M. Leonardi, E. M. Pitchon, A. Bertsch, P. Renaud, and A. Mermoud, "Wireless contact lens sensor for intraocular pressure monitoring: assessment on enucleated pig eyes," *Acta ophthalmologica*, vol. 87, pp. 433-437, 2009.

[2] S. J. M. Bamberg, A. Y. Benbasat, D. M. Scarborough, D. E. Krebs, and J. A. Paradiso, "Gait analysis using a shoe-integrated wireless sensor system," *Information Technology in Biomedicine, IEEE Transactions on*, vol. 12, pp. 413-423, 2008.

[3] T. Itoh and G. S. Springer, "Strain measurement with microsensors," *Journal of composite materials*, vol. 31, pp. 1944-1984, 1997.

[4] M. Sawan, Y. Hu, and J. Coulombe, "Wireless smart implants dedicated to multichannel monitoring and microstimulation," *Circuits and Systems Magazine, IEEE*, vol. 5, pp. 21-39, 2005.

[5] W. Li, D. C. Rodger, E. Meng, J. D. Weiland, M. S. Humayun, and Y.-C. Tai, "Wafer-level parylene packaging with integrated RF electronics for wireless retinal prostheses," *Microelectromechanical Systems, Journal of*, vol. 19, pp. 735-742, 2010.

[6] A. E. Czarnecki, "Efficient inductively coupled resonant power transfer for an implantable electroencephalography recording device," NORTHEASTERN UNIVERSITY, 2012.

[7] U. Schnakenberg, C. Krüger, J.-G. Pfeffer, W. Mokwa, G. vom Bögel, R. Günther, et al., "Intravascular pressure monitoring system," *Sensors and Actuators A: Physical*, vol. 110, pp. 61-67, 2004.

[8] N. F. Sheppard Jr and C. M. Feakes, "Methods for conformal coating and sealing microchip reservoir devices," ed: Google Patents, 2005.

[9] T. Adrega and S. Lacour, "Stretchable gold conductors embedded in PDMS and patterned by photolithography: fabrication and electromechanical characterization," *Journal of Micromechanics and Microengineering*, vol. 20, p. 055025, 2010.

[10] L. Bowman and J. D. Meindl, "The packaging of implantable integrated sensors," *Biomedical Engineering, IEEE Transactions on*, pp. 248-255, 1986.

[11] H. Macleod and D. Richmond, "Moisture penetration patterns in thin films," *Thin Solid Films*, vol. 37, pp. 163-169, 1976.

[12] J. M. Anderson, A. Rodriguez, and D. T. Chang, "Foreign body reaction to biomaterials," in *Seminars in immunology*, 2008, pp. 86-100.

[13] F. Silver, Y. Kato, M. Ohno, and A. Wasserman, "Analysis of mammalian connective tissue: relationship between hierarchical structures and mechanical properties," *Journal of long-term effects of medical implants*, vol. 2, pp. 165-198, 1991.

[14] P.-J. Chen, D. C. Rodger, S. Saati, M. S. Humayun, and Y.-C. Tai, "Microfabricated implantable parylene-based wireless passive intraocular pressure sensors," *Microelectromechanical Systems, Journal of*, vol. 17, pp. 1342-1351, 2008.

[15] M. G. Allen, "Micromachined endovascularly-implantable wireless aneurysm pressure sensors: from concept to clinic," in *Solid-State Sensors, Actuators and Microsystems, 2005. Digest of Technical Papers. TRANSDUCERS '05. The 13th International Conference on*, 2005, pp. 275-278.

[16] J. W. B. Spillman and S. Durkee, "Noncontact power/interrogation system for smart structures," pp. 362-372, 1994.

[17] C. C. Tai, J. H. Rose, and J. C. Moulder, "Thickness and conductivity of metallic layers from pulsed eddy-current measurements," *Review of scientific Instruments*, vol. 67, pp. 3965-3972, 1996.

[18] J. R. Long, "Monolithic transformers for silicon RF IC design," *Solid-State Circuits, IEEE Journal of,* vol. 35, pp. 1368-1382, 2000.

[19] G. Li and P. Miao, "Theoretical background of electrochemical analysis," in *Electrochemical Analysis of Proteins and Cells,* ed: Springer, 2013, pp. 5-18.

[20] C. A. Gutierrez, C. McCarty, B. Kim, M. Pahwa, and E. Meng, "An Implantable All-Parylene Liquid-Impedance Based MEMS Force Sensor," in *MEMS 2010: 23rd IEEE International Conference on Micro Electro Mechanical Systems, Technical Digest,* ed New York: IEEE, 2010, pp. 600-603.

[21] E. Meng and Y.-C. Tai, "Parylene etching techniques for microfluidics and bioMEMS," in *Micro Electro Mechanical Systems, 2005. MEMS 2005. 18th IEEE International Conference on,* 2005, pp. 568-571.

[22] E. Meng, P.-Y. Li, and Y.-C. Tai, "Plasma removal of Parylene C," *Journal of Micromechanics and Microengineering,* vol. 18, p. 045004, 2008.

[23] A. M. Johnson, D. R. Sadoway, M. J. Cima, and R. Langer, "Design and testing of an impedance-based sensor for monitoring drug delivery," *Journal of the Electrochemical Society,* vol. 152, pp. H6-H11, 2005.

[24] J. E. B. Randles, "Kinetics of Rapid Electrode Reactions," *Discussions of the Faraday Society,* vol. 1, pp. 11-19, 1947.

[25] A. Baldwin, L. Yu, and E. Meng, "An Electrochemical-Based Thermal Flow Sensor," presented at the 29th IEEE International Conference on Micro Electro Mechanical Systems, MEMS 2016, Jan. 24-Jan. 28, 2016. Shanghai, China, 2016.

What is claimed is:

1. A sensor for measuring electrochemical impedance comprising:
   a primary circuit that includes a primary electrically conducting coil;
   a secondary circuit that includes a first electrically insulating layer, a secondary electrically conducting coil disposed over and contacting the first electrically insulating layer, a first metal contact electrode, a second metal contact electrode, and a second electrically insulating layer disposed over the secondary electrically conducting coil, the secondary electrically conducting coil including a first end and a second end that are attached respectively to the first metal contact electrode and the second metal contact electrode, the second electrically insulating layer defining openings that expose the first metal contact electrode and the second metal contact electrode, wherein the primary electrically conducting coil is inductively coupled to the secondary electrically conducting coil, the first end of the secondary electrically conducting coil directly contacts the first metal contact electrode and the second end of the secondary electrically conducting coil directly contacts the second metal contact electrode; and
   an alternating current source energizing the primary electrically conducting coil during impedance measurements.

2. The sensor of claim 1 wherein during operation, the secondary circuit is positioned in a medium for which the electrical impedance is to be measured.

3. The sensor of claim 1 wherein the primary electrically conducting coil is positioned proximate to but spatially separated from the secondary electrically conducting coil.

4. The sensor of claim 1 wherein the primary electrically conducting coil is positioned within 5 centimeters from the secondary electrically conducting coil.

5. The sensor of claim 1 wherein the alternating current source is an impedance meter.

6. The sensor of claim 1 wherein the first electrically insulating layer is a polymeric substrate.

7. The sensor of claim 1 wherein the second electrically insulating layer is a polymeric layer.

8. The sensor of claim 1 wherein the secondary electrically conducting coil is deposited as a spiraling metal pattern onto the first electrically insulating layer.

9. The sensor of claim 1 wherein a coupling coefficient between the primary electrically conducting coil and the secondary electrically conducting coil is greater than or equal to 0.8.

10. The sensor of claim 1 wherein an inductance of the secondary electrically conducting coil is from 1 to 100 microhenries.

11. The sensor of claim 1 wherein the first metal contact electrode and the second metal contact electrode are configured to contact a liquid.

12. A method for measuring electrochemical impedance comprising:
    providing a primary circuit that includes a primary electrically conducting coil;
    providing a secondary circuit that includes a first electrically insulating layer, a secondary electrically conducting coil disposed over and contacting the first electrically insulating layer, a first metal contact electrode, a second metal contact electrode, and a second electrically insulating layer disposed over the secondary electrically conducting coil, the secondary electrically conducting coil including a first end and a second end that are directly contacting the first metal contact electrode and the second metal contact electrode, respectively, the second electrically insulating layer defining openings that expose the first metal contact electrode and the second metal contact electrode,
    contacting the first metal contact electrode and the second metal contact electrode of the secondary circuit with a liquid medium for which an impedance is to be measured;
    positioning the primary electrically conducting coil proximate to the secondary electrically conducting coil such that the primary electrically conducting coil is inductively coupled to the secondary electrically conducting coil; and
    applying an alternating current to the primary electrically conducting coil to perform an impedance measurement.

13. The method of claim 12 wherein the alternating current is applied from an impedance meter.

14. The method of claim 12 wherein the first electrically insulating layer is a polymeric substrate.

15. The method of claim 12 wherein the second electrically insulating layer is a polymeric layer.

16. The method of claim 12 wherein the secondary electrically conducting coil is deposited as a spiraling metal pattern onto the first electrically insulating layer.

17. The method of claim 12 wherein a coupling coefficient between the primary electrically conducting coil and the secondary electrically conducting coil is greater than or equal to 0.8.

18. The method of claim 12 wherein an inductance of the secondary electrically conducting coil is from 1 to 100 microhenries.

19. A method for forming a sensor for measuring electrochemical impedance comprises:
   a) coating a support substrate with a first electrically insulating layer;
   b) patterning a first metal layer onto the first electrically insulating layer, the first metal layer being patterned into a secondary electrically conducting coil with a first contact electrode directly contacting a first end of the secondary electrically conducting coil and a second contact electrode directly contacting a second end of the secondary electrically conducting coil;
   c) depositing a second electrically insulating layer over secondary electrically conducting coil;
   d) exposing the first contact electrode and the second contact electrode; and
   e) separating the support substrate from the first electrically insulating layer to release a secondary circuit.

20. The method of claim 19 further comprising forming a primary circuit by:
   a') patterning a second metal layer onto an electrically insulating substrate.

21. The method of claim 19 wherein the support substrate is a silicon wafer.

22. The method of claim 19 wherein a patterned adhesion layer is interposed between the first electrically insulating layer and the first metal layer.

* * * * *